(12) United States Patent
Just

(10) Patent No.: US 11,278,021 B1
(45) Date of Patent: Mar. 22, 2022

(54) WILDLIFE DETERRING WINDMILL

(71) Applicant: Timothy Just, Victorville, CA (US)

(72) Inventor: Timothy Just, Victorville, CA (US)

( * ) Notice: Subject to any disclaimer, the term of this patent is extended or adjusted under 35 U.S.C. 154(b) by 0 days.

(21) Appl. No.: 17/184,315

(22) Filed: Feb. 24, 2021

(51) Int. Cl.
  *F03D 1/06* (2006.01)
  *A01M 29/16* (2011.01)

(52) U.S. Cl.
  CPC .......... *A01M 29/16* (2013.01); *F03D 1/0633* (2013.01); *F03D 1/0675* (2013.01)

(58) Field of Classification Search
  CPC .... A01M 29/16; F03D 1/0633; F03D 1/0675; F03D 80/00; F05B 2240/221; F05B 2240/99
  USPC ...................................... 416/146 R
  See application file for complete search history.

(56) References Cited

U.S. PATENT DOCUMENTS

| | | | |
|---|---|---|---|
| 4,578,019 A * | 3/1986 | Safarik | B64C 11/34 |
| | | | 416/1 |
| 4,692,093 A * | 9/1987 | Safarik | B64D 41/007 |
| | | | 416/1 |
| 6,250,255 B1 * | 6/2001 | Lenhardt | A01M 29/16 |
| | | | 119/713 |
| 6,890,152 B1 * | 5/2005 | Thisted | F03D 80/40 |
| | | | 416/1 |
| 7,246,991 B2 * | 7/2007 | Bosche | F03D 7/0224 |
| | | | 415/14 |
| 8,093,994 B2 * | 1/2012 | McGaughy | B60Q 5/00 |
| | | | 340/384.2 |
| 8,098,040 B1 * | 1/2012 | Botto | B60L 8/006 |
| | | | 320/101 |
| 8,579,594 B2 * | 11/2013 | Fuglsang | F01D 5/145 |
| | | | 416/231 R |
| 8,598,998 B2 * | 12/2013 | Vassilev | F03D 80/10 |
| | | | 340/384.2 |
| 8,742,977 B1 | 6/2014 | Piesinger | |
| 8,747,069 B2 | 6/2014 | Zalusky et al. | |
| 8,784,059 B2 | 7/2014 | Zalusky et al. | |
| 8,864,462 B2 | 10/2014 | Mayda et al. | |
| 9,115,699 B2 * | 8/2015 | Kinzie | F03D 80/10 |
| 9,125,394 B2 * | 9/2015 | Kinzie | G10K 5/02 |
| 9,316,205 B2 | 4/2016 | Baker et al. | |
| 9,335,229 B2 | 5/2016 | Baker et al. | |
| 9,388,791 B2 | 7/2016 | Brooks et al. | |
| 9,388,792 B2 | 7/2016 | Baker | |

(Continued)

OTHER PUBLICATIONS

Gabbatiss, Sound Waves Could Be Used To Prevent Millions of Birds Flying into Wind Turbines, Feb. 16, 2018, The Independent, https://www.independent.com.uk/environment/sound-waves-prevent-millions-birds-flying-wind-turbines-farms-18214356.html, printed Jan. 14, 2019, 6 pages.

(Continued)

*Primary Examiner* — David E Sosnowski
*Assistant Examiner* — Wayne A Lambert
(74) *Attorney, Agent, or Firm* — Kwan & Olynick LLP

(57) ABSTRACT

Described herein are various systems and techniques for deterring wildlife from an area proximate a windmill. A flying wildlife emitter may be utilized for such techniques. The flying wildlife emitter may output soundwaves to deter wildlife, such as birds or bats, from entering an area around the windmill. The flying wildlife emitter may include a speaker for producing sounds as well as a controller and sensors for determining conditions around the windmill and for controlling the sound produced by the speaker.

17 Claims, 7 Drawing Sheets

(56) References Cited

U.S. PATENT DOCUMENTS

| | | | |
|---|---|---|---|
| 9,458,825 B2 | 10/2016 | Brooks et al. | |
| 9,488,157 B2 | 11/2016 | Baker et al. | |
| 9,521,830 B2* | 12/2016 | Wenger | F03D 80/00 |
| 10,034,471 B2 | 7/2018 | Green et al. | |
| 2005/0210858 A1* | 9/2005 | Gore | F03D 9/11 |
| | | | 60/201 |
| 2006/0051207 A1* | 3/2006 | Becerra | F03D 80/10 |
| | | | 416/5 |
| 2008/0298962 A1* | 12/2008 | Sliwa | F03D 80/00 |
| | | | 416/31 |
| 2009/0185900 A1* | 7/2009 | Hirakata | F03D 17/00 |
| | | | 416/1 |
| 2010/0194603 A1* | 8/2010 | Wobben | F03D 80/10 |
| | | | 340/983 |
| 2012/0243980 A1 | 9/2012 | Zalusky et al. | |
| 2012/0248256 A1 | 10/2012 | Mayda | |
| 2012/0263601 A1 | 10/2012 | Baker et al. | |
| 2013/0050400 A1* | 2/2013 | Stiesdal | F03D 80/10 |
| | | | 348/36 |
| 2013/0224018 A1* | 8/2013 | Kinzie | F03D 80/10 |
| | | | 416/1 |
| 2014/0148978 A1* | 5/2014 | Duncan | A01M 29/12 |
| | | | 701/3 |
| 2014/0209040 A1* | 7/2014 | Kinzie | G10K 5/02 |
| | | | 119/719 |
| 2014/0271184 A1 | 9/2014 | Baker et al. | |
| 2014/0271185 A1 | 9/2014 | Baker et al. | |
| 2014/0271186 A1 | 9/2014 | Baker et al. | |
| 2014/0271187 A1 | 9/2014 | Baker | |
| 2014/0271191 A1 | 9/2014 | Brooks et al. | |
| 2014/0271193 A1 | 9/2014 | Baker et al. | |
| 2014/0271212 A1 | 9/2014 | Brooks et al. | |
| 2014/0377061 A1* | 12/2014 | Caruso | F03D 7/0264 |
| | | | 416/1 |
| 2016/0366875 A1 | 12/2016 | Green et al. | |
| 2017/0342966 A1 | 11/2017 | Barber | |

OTHER PUBLICATIONS

Office of Energy Efficiency & Renewable Energy, Energy Departement Awards $6.8 Million in Wind Energy Research Project, Mar. 13, 2019, https:/www.energy.gov/eere/articles/enengy-department-awards-68-million-wind-energy-research-projects, 4 pages.

* cited by examiner

WILDLIFE DETERRING WINDMILL

TECHNICAL FIELD

The present disclosure generally relates to windmills. More specifically, the present disclosure relates to windmills and windmill attachments that prevent bird, bat, and other wildlife fatalities resulting from the propeller blades of the windmills.

BACKGROUND

Wildlife fatalities caused by windmills is a prevalent problem. For example, bird or bats may migrate, congregate, or fly through an area with windmills. The rotation of the propellers of windmills may strike flying animals such as bird or bats or may create large low pressure areas that damage the internal organs of such animals. As such, during migration season, windmills need to be shut down to avoid ravaging wildlife populations. The need to shutdown causes serious downtime for these windmills, decreasing their return on investment and the amount of power that they can generate.

SUMMARY

Provided are various mechanisms and processes for deterring wildlife from entering an area proximate to a windmill. In a certain embodiment, a system may be disclosed. The system may include a generator, a plurality of windmill propellers, coupled to the generator and including at least a first windmill propeller, and a first flying wildlife emitter, coupled to the first windmill propeller. The first flying wildlife emitter includes a speaker configured to generate soundwaves audible to at least one of birds or bats and an emitter generator, electrically coupled to the speaker and configured to generate electrical power to power the speaker.

In a further embodiment, a flying wildlife emitter may be disclosed. The flying wildlife emitter may include a speaker configured to generate soundwaves audible to at least one of birds or bats, an emitter generator, electrically coupled to the speaker and configured to generate electrical power to power the speaker, an emitter propeller, coupled to the emitter generator and configured to rotate a portion of the electrical generator, and a coupler, configured to couple to a windmill propeller.

These and other embodiments are described further below with reference to the figures.

BRIEF DESCRIPTION OF THE DRAWINGS

The included drawings are for illustrative purposes and serve only to provide examples of possible structures and operations for the disclosed inventive systems, apparatus, methods and computer program products described herein. These drawings in no way limit any changes in form and detail that may be made by one skilled in the art without departing from the spirit and scope of the disclosed implementations.

DETAILED DESCRIPTION OF PARTICULAR EMBODIMENTS

This disclosure describes techniques, methods, systems, apparatus, and computer program products that may be used during operation of a windmill. As described herein, a flying wildlife emitter may output soundwaves to deter wildlife such as birds or bats from entering an area around the windmill. Typically, birds and bats are susceptible to injury or death due to the operation of windmills. While birds are typically struck by windmill propeller blades, bats typically avoid the propeller blades due to their sonar sensing, but after avoiding the blade, may enter the area vacated by the propeller blade. However, the negative pressure present on the backside of the propeller blade may then cause bats to suffer catastrophic lung failure. Bats congregate near windmills as windmills generate small micro environments of tornadoes. Insects are drawn to these micro environments and the bats utilize these bugs as sources of food. Bat fatalities are particularly disastrous for food generation in this country, as bats do a tremendous amount of pollination.

Currently, during peak migration periods, or other periods, windmills are required to be shut down to avoid excessive wildlife fatalities. When windmills are shut down, power is unable to be generated.

In certain embodiments, the flying wildlife emitter may be removably coupled to the windmill (e.g., may be retrofitted to existing windmill propeller blades). Such removably coupled flying wildlife emitters may include power generation components to power the flying wildlife emitters. In other embodiments, the flying wildlife emitter may be semi-permanently coupled to a windmill propeller blade and may, thus, be powered by the windmill. The flying wildlife emitter may deter wildlife from moving proximate to the windmill while the windmill is operating. Thus, the flying wildlife emitter may allow for gains in power generation as windmills may no longer need to be shut down during peak migration periods, or during other such periods.

Figure 1:
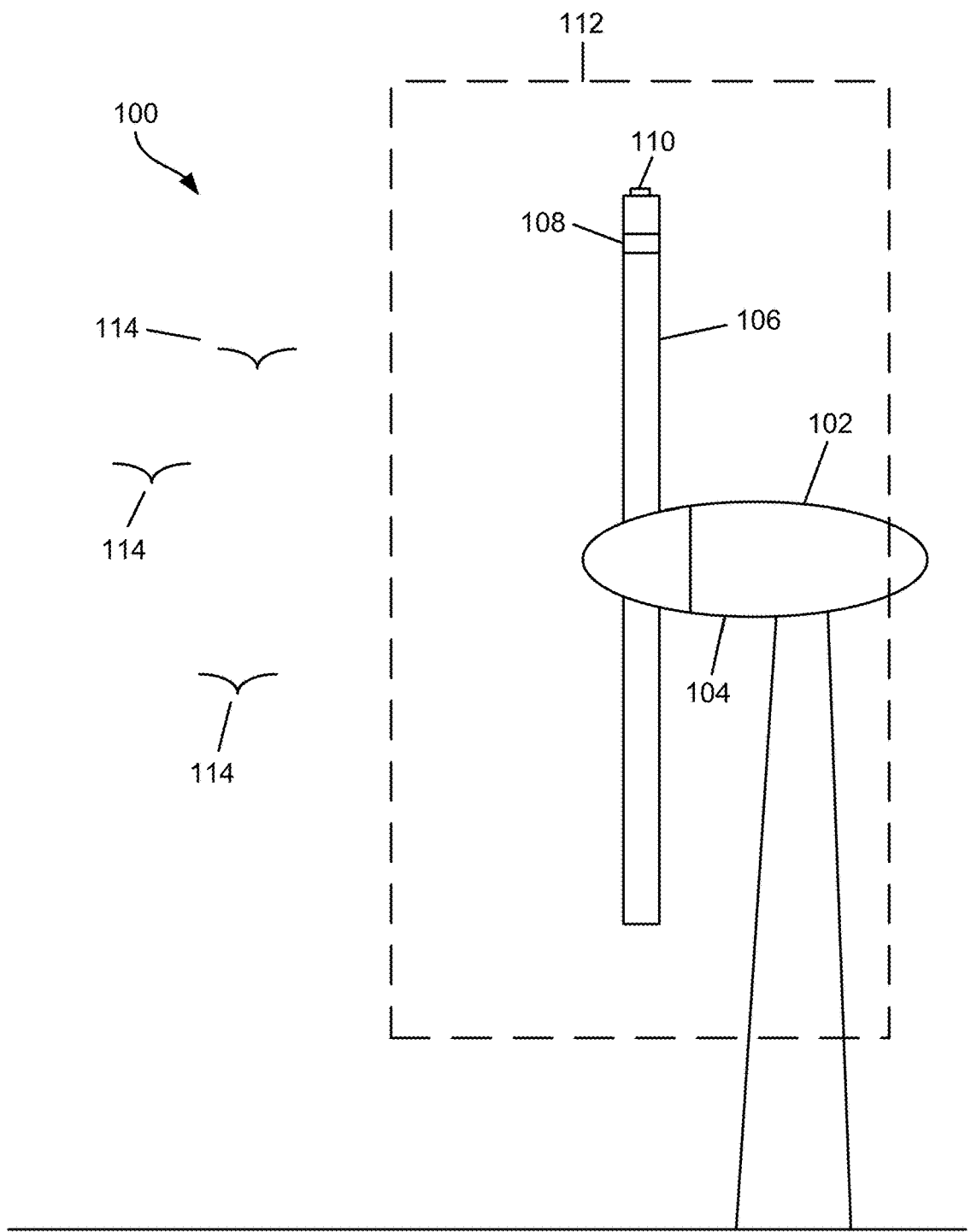
FIG. 1 illustrates a representation of a windmill within an operating environment, in accordance with one or more embodiments.

FIG. 1 illustrates a representation of a windmill within an operating environment, in accordance with one or more embodiments. FIG. 1 illustrates system 100 that includes windmill 102 with flying wildlife emitter 108.

Windmill 102 may include nacelle 104. Nacelle 104 may house an electrical generator that is configured to generate electrical power. The electrical generator may generate electricity through rotation. The electrical generator may be powered by propeller 106, which may be configured to spin the electrical generator. Propeller 106 may be powered by wind in the general environment and may include a profile efficient for powering by the wind. As such, wind may drive propeller 106 to turn the electrical generator within nacelle 104 to generate electrical power.

Flying wildlife emitter 108 may be coupled to propeller 106. In various embodiments, flying wildlife emitter 108 may be removably coupled to (e.g., retrofitted onto) or semi-permanently coupled to (e.g., integrated into) propeller 106. Propeller 106 may include light 110. Light 110 may be positioned on an end of propeller 106 to provide warning to aircraft and other flying vehicles as to the presence of propeller 106.

Windmill 102 may include a plurality of propellers 106 and one, some, or all of them may include one or more flying wildlife emitters 108. In various embodiments, only one flying wildlife emitter 108 may generate enough soundwaves to deter wildlife from flying close enough to propeller 106 (e.g., flying within zone 112) and, thus, minimize the risk of operation of windmill 102 to such wildlife. Other embodiments may require a plurality of flying wildlife emitters 108. In certain embodiments, each of the blades of propeller 106 may include the same number of flying wildlife emitters 108 for weight balance.

Flying wildlife emitter 108 may be configured to emit soundwaves to deter wildlife from entering zone 112. Thus, flying wildlife emitter 108 may be configured to emit soundwaves of certain frequencies. Soundwaves of certain such frequencies may deter wildlife from entering zone 112. In the example of FIG. 1, flying wildlife 114 may be present in the area around windmill 102. The soundwaves generated by flying wildlife emitter 108 may deter wildlife from entering zone 112.

In certain embodiments, the frequencies generated by flying wildlife emitter 108 may be tailored based on the animals that flying wildlife emitter 108 is configured to deter from entering zone 112. As such, the frequencies may be tailored depending on the type of animal (e.g., bird, bat, insect, or another type of animal), the species of the animal, and/or the size of zone 112 desired. In certain such embodiments, the frequency or volume may be accordingly configured and the sound may be audible or inaudible to humans. In certain such embodiments, the frequency and/or volume may be varied during operation of flying wildlife emitter 108. Thus, for example, the frequency or volume may change depending on the detected position of flying wildlife emitter 108 (e.g., whether it's at the top, bottom, or side of the rotation) and/or other conditions described herein.

Figure 2A:
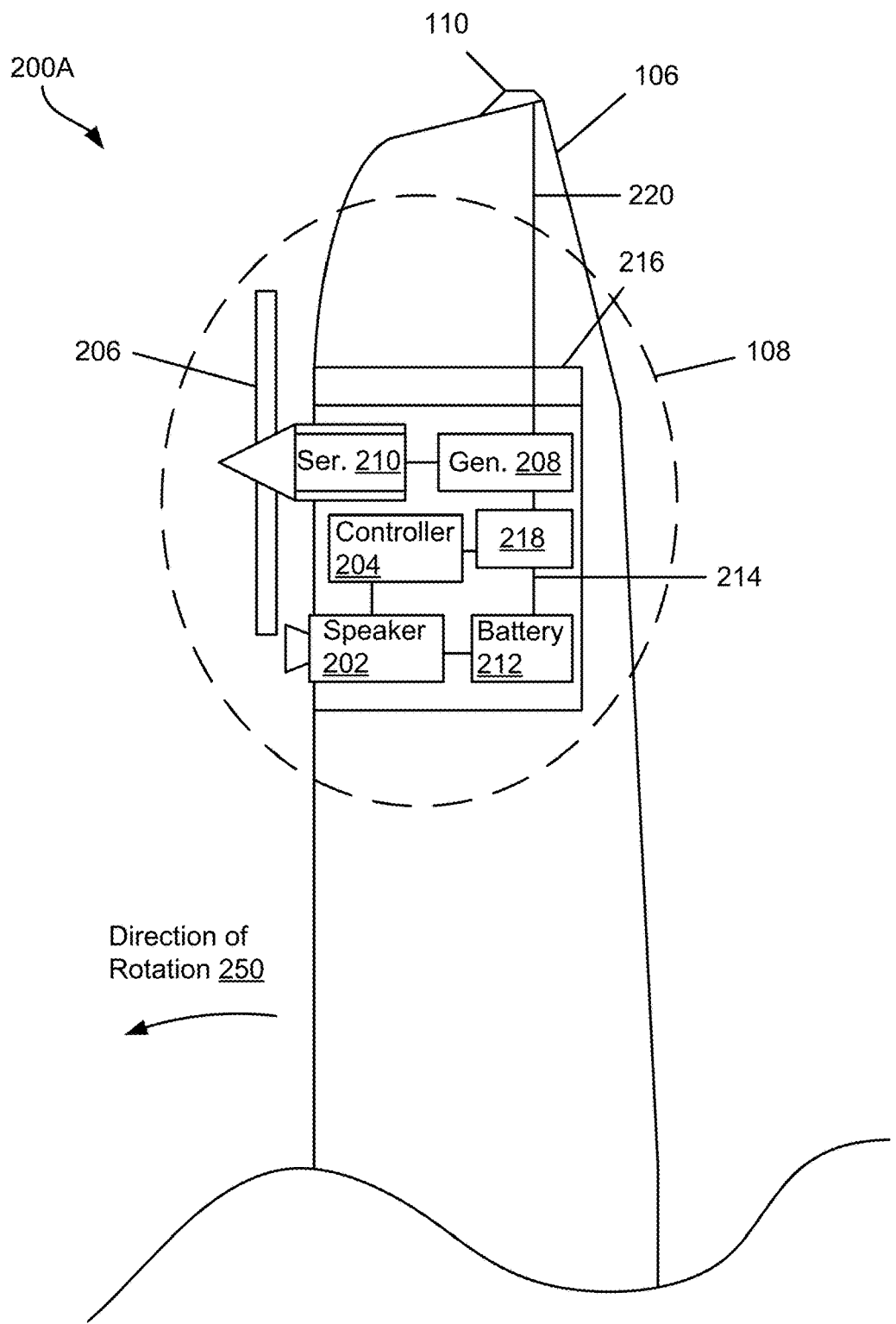
FIG. 2A illustrates a representation of a windmill with a flying wildlife emitter, in accordance with one or more embodiments.
Figure 2B:
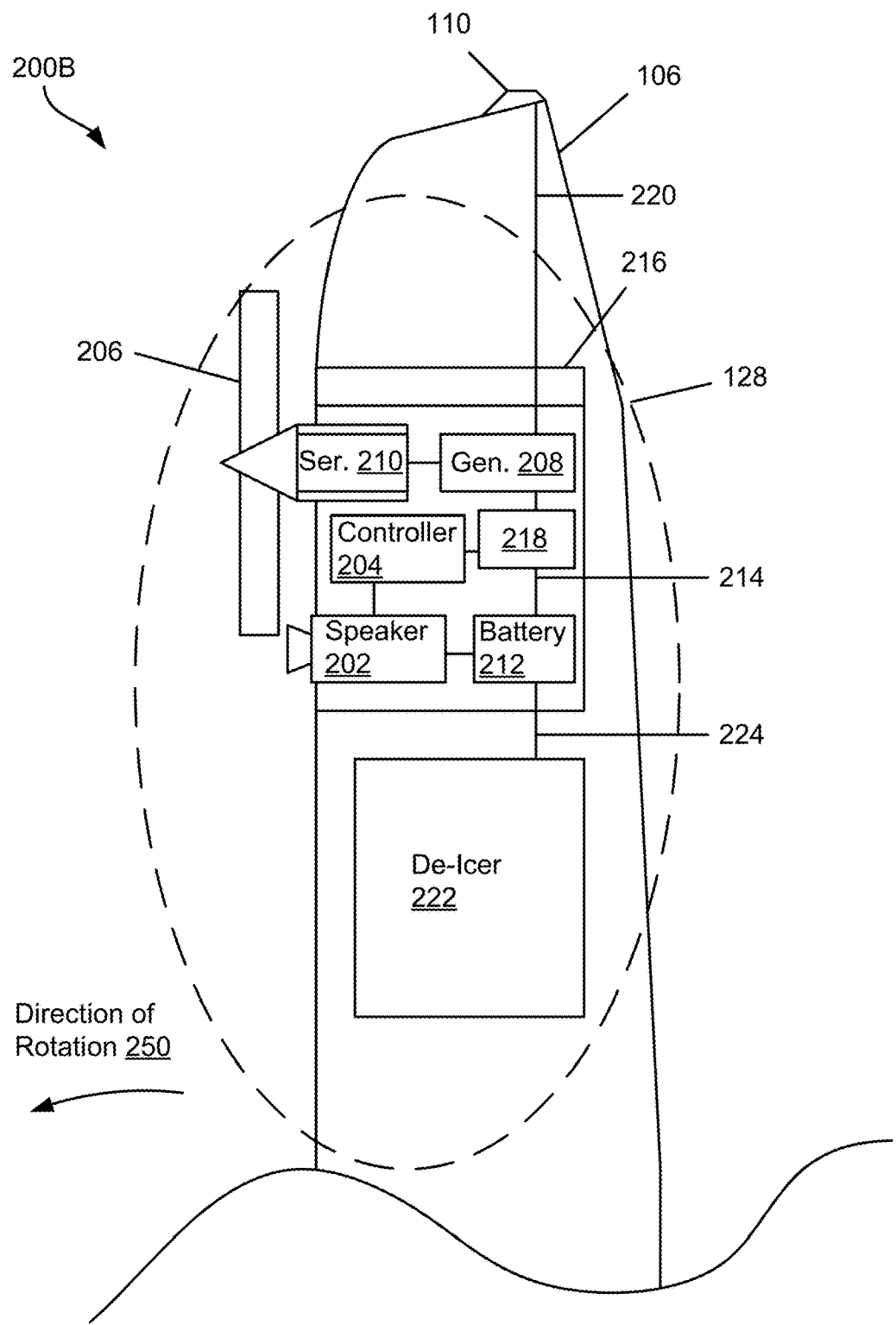
FIG. 2B illustrates another representation of a windmill with a flying wildlife emitter, in accordance with one or more embodiments.
Figure 3:
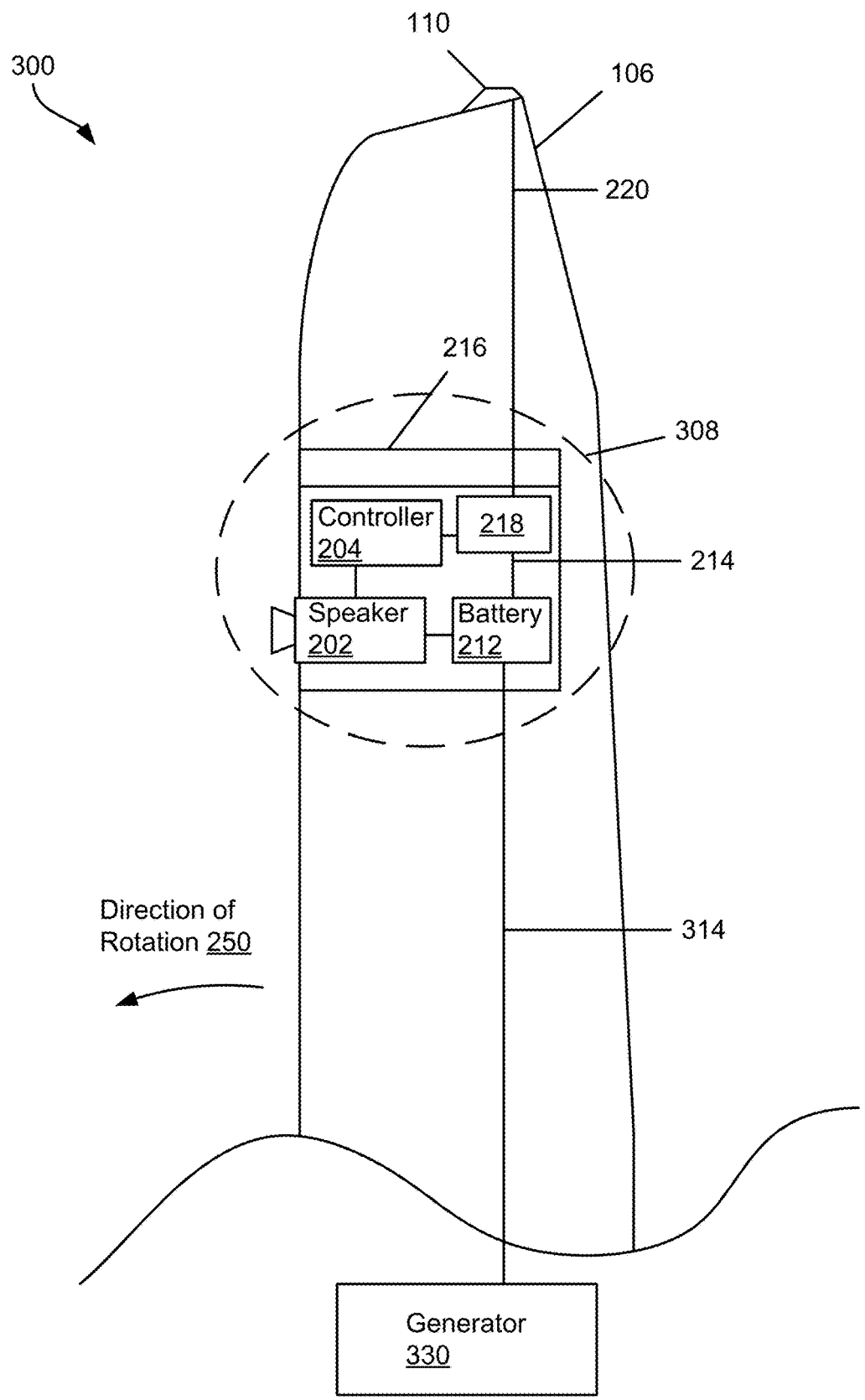
FIG. 3 illustrates a further representation of a windmill with a flying wildlife emitter, in accordance with one or more embodiments.

FIG. 2A illustrates a representation of a windmill with a flying wildlife emitter, in accordance with one or more embodiments. FIG. 2A illustrates system 200A that includes propeller 106 and flying wildlife emitter 108. Propeller 106 may be a propeller blade of a windmill, as described herein.

Flying wildlife emitter 108 may be coupled to propeller 106. In certain embodiments, flying wildlife emitter 108 may be removably coupled propeller 106 or semi-permanently coupled. As shown in FIG. 2A, flying wildlife emitter 108 may include coupler 216. Coupler 216 may be, for example, one or more of mechanical fasteners (e.g., screws, bolts, nuts, rivets, and other mechanical fasteners), welding, adhesives, mechanical components (e.g., brackets), and/or other such items that may secure flying wildlife emitter 108 to propeller 106. For semi-permanently mounted embodiments, flying wildlife emitter 108 may be integrated within propeller 106 (e.g., may be fully or partially internally integrated within the blade of propeller 106). Accordingly, some or all portions of flying wildlife emitter 108 may be disposed within propeller 106.

Flying wildlife emitter 108 may additionally include speaker 202, controller 204, emitter propeller 206, generator 208, servo 210, battery 212, circuitry 214, and sensors 218.

Furthermore, in certain embodiments, light 110 may be powered by generator 208 and/or battery 212 of flying wildlife emitter 108 via circuitry 220, but other embodiments may power light 110 with power from the windmill and/or the power grid. Such circuitry, as described herein, may include electrical wiring and/or other circuitry configured to provide electrical power. Additionally or alternatively, such circuitry may also include wired or wireless communications techniques that may communicate data.

Controller 204 may be a controller with one or more memories and processors. The processors may be any appropriate single or multi-core processor. The memory may include any type of harddrive, solid state, or other transitory or non-transitory memory that support processing as well as store instructions for performing operations as described herein. In various embodiments, controller 204 may be configured to control operations of portions of flying wildlife emitter 108 (e.g., operation of servo 210) and/or may control operations of the windmill in general. In certain such embodiments, circuitry 214 may provide data for operation of controller 204 as well as for controller 204 to direct operations of the components described herein.

Speaker 202 may be configured to produce sounds as described herein. Speaker 202 may be configured to produce sounds in a range of frequencies and amplitudes. Such frequency and amplitude ranges may be configured to deter wildlife from traveling close to propeller 106 and/or other portions of the windmill. For example, speaker 202 may be configured to produce sound at frequencies of between 0.5 kilohertz (kHz) to 300 kHz at amplitudes appropriate to warn wildlife away from propeller 106 or other portions of the windmill.

For example, controller 204, communicatively coupled to speaker 202, may be configured to cause speaker 202 to generate sound in certain frequencies. Accordingly, for example, controller 204 may determine in certain situations that speaker 202 should be deterring bats from propeller 106 or other portions of the windmill. As such, controller 204 may cause speaker 202 to produce sounds of between 9 to 200 kHz as such frequencies may be within the hearing capacity of bats. Additionally or alternatively, controller 204 may cause speaker 202 to produce sounds of between 1 to 4 kHz as such frequencies may be within the hearing capacity of birds. Furthermore, in certain embodiments, the sound emitted may deter bugs or other wildlife and, accordingly, deter animals that feed on them (e.g., bats) from being proximate to the windmill.

In certain embodiments, the types of animals may be predetermined (e.g., by inputs and/or data communicated to controller 204 from an external source). In other embodiments, sensors 218 may include, for example, visual, infrared, radar, lidar, sound, and/or other types of sensors that may collect data related to the environment around the windmill, communicate the data to controller 204, and allow for controller 204 to determine the types of wildlife nearby. Based on the determination of the types of wildlife nearby, an appropriate frequency or frequency range may be selected for speaker 202.

Speaker 202 may be powered by generator 208, battery 212, and/or another electrical power source (e.g., may be electrically coupled to the circuitry of the windmill and may be powered from electrical power generated by the electrical windmill and/or may be powered by electrical power from the grid). Battery 212 may receive and store power from generator 208. Battery 212 may be any type of appropriate battery, such as a lead acid battery, a solid state battery, and/or another such type of battery.

Generator 208 may be configured to produce electrical power when a portion of generator 208 is rotated. Thus, generator 208 may be, in certain embodiments, an alternator or other type of generator. For example, rotation of the portion of generator 208 may cause electromagnetic fields to be generated and produce electrical power. In certain embodiments, generator 208 may, thus include various coils, windings, and/or other such components. In various embodiments, circuitry 214 may transmit power generated by generator 208 to battery 212 and/or may communicate such power to the various components of flying wildlife emitter 108.

In various embodiments, generator 208 may be rotated by emitter propeller 206. Emitter propeller 206 may be configured to spin while propeller 106 is rotating. As such, the profile of emitter propeller 206 may be a profile that allows for emitter propeller 206 to be efficiently driven (e.g., rotated) when propeller 106 is, for example in rotation (e.g., along direction of rotation 250). As windmills may be oriented to face the wind and emitter propellers may be oriented in a direction at an angle to that of the main propeller of the windmill, such a configuration may allow for emitter propeller 206 to be driven while the direction of the wind would not typically drive emitter propeller 206.

In certain other embodiments, generator 208 may be powered by kinetic energy generated by rotation of propeller 106 (e.g., from the angular acceleration produced by rotation of propeller 106). Generator 208 may, thus, be a kinetic energy generator. In such embodiments, emitter propeller 206 and servo 210 may be absent.

In certain embodiments, the pitch angle of emitter propeller 206 may be varied. For example, servo 210 may be coupled to a portion of emitter propeller 206 (e.g., via one or more linkages coupled to a base of a propeller, configured to rotate the propeller) and may be configured to control the pitch angle of emitter propeller 206. Servo 210 may orient the pitch of emitter propeller 206 at an angle that allows for emitter propeller 206 to rotate at an optimal speed to turn generator 208 while minimizing drag. The pitch angle of emitter propeller 206 may be varied so that, in certain configurations, emitter propeller 206 is driven by rotation of propeller 106 while, in other configurations, emitter propeller 206 may be in a "feathered" configuration to provide minimal air resistance to rotation of propeller 106. Such a "feathered" configuration may be, for example, a configuration where emitter propeller 206 is rotated parallel to the airflow resulting from propeller 106 rotating along direction of rotation 250. The "feathered" configuration allows for propeller 106 to more efficiently rotate and generate power while emitter propeller 206 is not operating (e.g., may minimize drag resulting from emitter propeller 206).

In certain embodiments, light 110 may also be powered by battery 212 and/or generator 208 via circuitry 220. In other embodiments, light 110 may be powered by power generated and/or stored by the windmill and/or from the grid. In certain embodiments, light 110 may be, for example, a LED, an incandescent bulb, and/or another light emitting source. Light 110 may be configured to emit light as describe herein.

FIG. 2B illustrates another representation of a windmill with a flying wildlife emitter, in accordance with one or more embodiments. FIG. 2B illustrates system 200B that includes flying wildlife emitter 128 and propeller 106. Flying wildlife emitter 128 may include speaker 202, controller 204, emitter propeller 206, generator 208, servo 210, battery 212, circuitry 214, coupler 216, sensors 218, de-icer 222, and circuitry 224. Propeller 106 may further include lights 110 and circuitry 220. Flying wildlife emitter 128 may, in certain embodiments, be removably coupled to propeller 106 and/or semi-permanently coupled to propeller 106, as described herein.

Speaker 202, controller 204, emitter propeller 206, generator 208, servo 210, battery 212, circuitry 214, coupler 216, sensors 218, lights 110, and circuitry 220 may be similar to that described in FIG. 2A described herein. As shown in FIG. 2B, servo 210 may have rotated emitter propeller 206 into a featured configuration, to minimize drag for rotation of propeller 106. As such, generator 208 may currently not be needed to provide power to flying wildlife emitter 128.

De-icer 222 may be configured to provide anti-icing or de-icing capabilities for propeller 106. As such, de-icer 222 may, for example, provide heating capabilities that may prevent formation of ice and/or melt ice that is formed on propeller 106. De-icer 222 may be electrically coupled to generator 208 and/or battery 212 via circuitry 224. Circuitry 224 may be electrical circuitry that delivers electrical power to de-icer 222.

In certain embodiments, propeller 106 may be shaped to be efficiently powered by wind. Formation of ice on propeller 106 may affect the aerodynamics of propeller 106, leading to less efficient operation of propeller 106 and, in certain situations, less power generated for certain wind conditions. De-icer 222 may include, for example, electrically powered heating elements that, when powered, may generate heat for de-icing and/or anti-icing. De-icer 222, in certain embodiments, may be removably or semi-permanently coupled to propeller 106 and may be, for example, flat heating elements that may be coupled to a surface of propeller 106. In certain other embodiments, de-icer 222 may be semi-permanently coupled to propeller 106 and may include heating elements disposed below a surface of propeller 106. It is appreciated that, in certain embodiments, de-icer 222 may be coupled to other portions of the windmill, such as at the joints or on the nacelle, to prevent freezing.

FIG. 3 illustrates a further representation of a windmill with a flying wildlife emitter, in accordance with one or more embodiments. FIG. 3 illustrates system 300 that includes propeller 106, lights 110, circuitry 220 and 314, flying wildlife emitter 308, and generator 330. Flying wildlife emitter 308 may include speaker 202, controller 204, battery 212, coupler 216, and sensors 218. Speaker 202, controller 204, battery 212, coupler 216, and sensors 218 may be as described herein. Flying wildlife emitter 308 may be removably or semi-permanently coupled to propeller 106.

In certain embodiments, portions of flying wildlife emitter 308 (e.g., speaker 202, controller 204, and/or sensors 218) may receive power from generator 330. Generator 330 may be a generator powered by propeller 106. As such, generator 330 may be any generator typically included within windmills and configured to generate power for an electrical grid. Thus, propeller 106 may be configured to be rotated by wind, to rotate at least a portion of generator 330 to produce electrical power.

At least a portion of such power may power portions of flying wildlife emitter 308 via circuitry 314. Additionally or alternatively, power from generator 330 may be stored within battery 212 and power from battery 212 may power portions of flying wildlife emitter 308. In certain embodiments, circuitry 314 may be hardwired between flying wildlife emitter 308 and generator 330, but other embodiments may include various connectors that allow for coupling/decoupling of portions of circuitry 314 and/or allow for flying wildlife emitter 308 to be removably coupled from propeller 106. Light 110 may also be powered by generator 330 via circuitry 220 and/or may be powered by battery 212.

Figure 4:
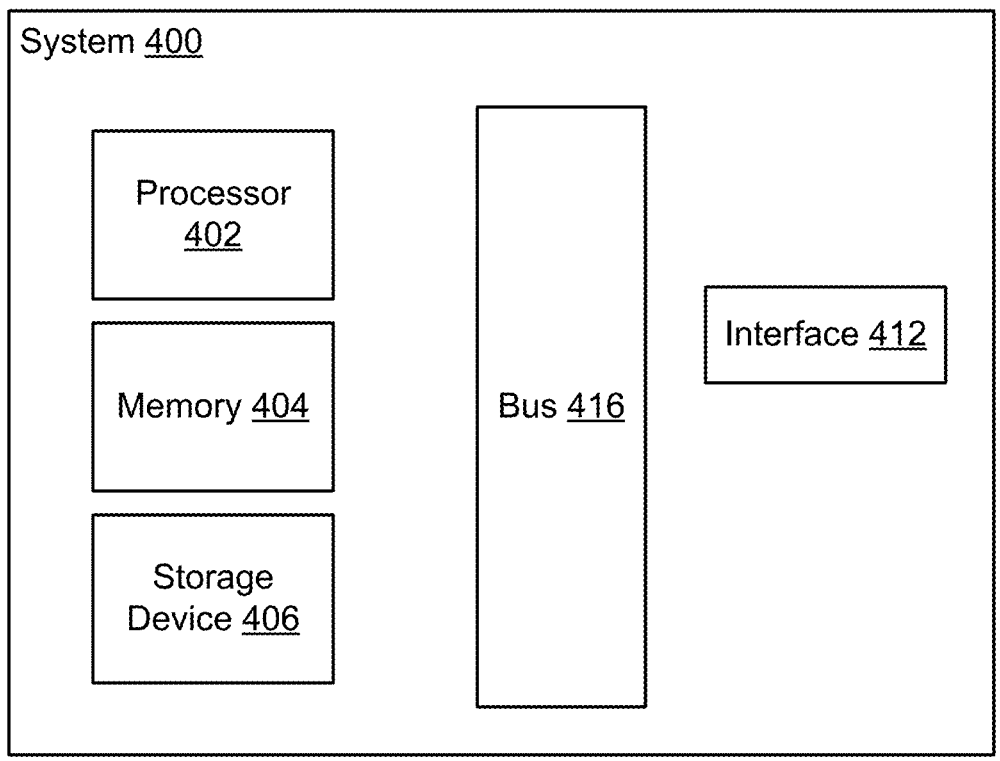
FIG. 4 illustrates a block diagram of a controller system, in accordance with one or more embodiments.

FIG. 4 illustrates a block diagram of a controller system, in accordance with one or more embodiments. According to various embodiments, controller 400 suitable for implementing embodiments described herein. Controller 400 includes processor 402, memory module 404, storage device 406, interface 412, and bus 416 (e.g., a PCI bus or other interconnection fabric.) Controller 400 may operate as variety of devices such as a server system such as an application server and a database server, a client system such as a laptop, desktop, smartphone, tablet, wearable device, set top box, etc., or any other device or service described herein. Although a particular configuration is described, a variety of alternative configurations are possible.

Processor 402 may perform operations such as those described herein. Instructions for performing such operations may be embodied in memory 404, on one or more non-transitory computer readable media, or on some other storage device. Various specially configured devices can also be used in place of or in addition to processor 402. Interface 412 may be configured to send and receive data packets over a network. Examples of supported interfaces include, but are not limited to: Ethernet, fast Ethernet, Gigabit Ethernet, Bluetooth, Near Field Communications (NFC), frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Figure 5:
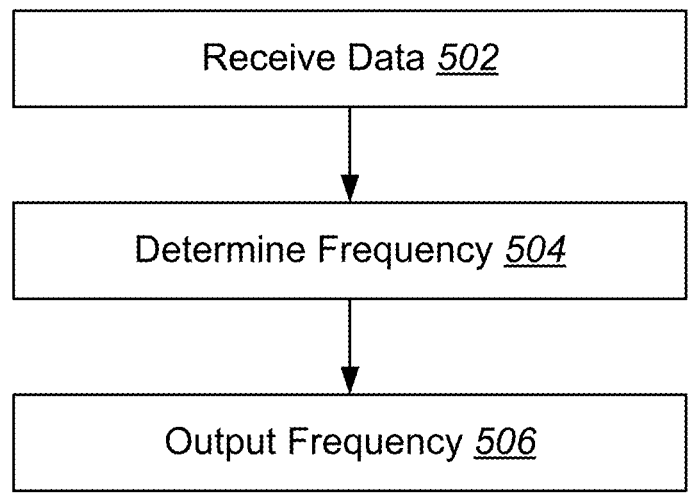
FIG. 5 illustrates a flow process for determining an output frequency for a flying wildlife emitter, in accordance with one or more embodiments.

FIG. 5 illustrates a flow process for determining an output frequency for a flying wildlife emitter, in accordance with one or more embodiments. FIG. 5 illustrates a technique for determining the frequencies of sound to be provided by the speaker of the flying wildlife emitter.

In 502, data may be received that may indicate frequencies for operation of the speaker. Such data may include, for example, communications from another device (e.g., a windmill controller or a device with wireless communications data communicated via Bluetooth, WiFi, and/or other wireless communications protocol). Thus, for example, controller 204 may include a communications module configured to wirelessly communicate with external devices. Such external devices may provide data indicating the frequency and/or frequency range of sound that speaker 202 should produce and the appropriate frequency and/or frequency range selected in 504. In other embodiments, the external device may indicate the type of wildlife to be deterred. Controller 204 may include data directed towards the frequency ranges that each type of wildlife can hear sounds within and/or recommended frequency ranges to deter each type of wildlife. A frequency or frequency range may be accordingly selected in 504. In certain other embodiments, controller 204 may receive data from sensors 218 and may determine the type of wildlife (e.g., bird, bat, insect, the sizes thereof, and/or other characteristics) proximate to the windmill from such data.

Thus, for example, sensors 218 may include visual or thermal cameras as well as radar, lidar, and/or other sensors configured to determine the shape, size, and/or movement patterns of wildlife proximate the windmill. As such, for example, sensors 218 may visually acquire the shape and/or size of wildlife proximate to the windmill. The shape and/or size may be matched to data directed to shape and/or sizes of potential wildlife types. Such data may be stored within a database (e.g., within controller 204 and/or on a cloud database in communication with controller 204).

Furthermore, the type of wildlife may further be determined based on their thermal signature (e.g., their body temperature). Such factors may be used to determine one or more candidate wildlife. A movement pattern of the wildlife may also be determined (e.g., from video data). Thus, for example, bats may move in a manner that is different from that of birds, with different acceleration characteristics and changes of direction. Video data may capture such movements, controller 204 may identify such movements, and the movement of wildlife may accordingly be used to identify the type of wildlife.

Additionally or alternatively, sensors 218 may include one or more audio sensors. Such audio sensors may detect sound in a variety of ranges, including within ranges that are not inaudible to humans. The audio sensors may determine a tone of sound emitted by the wildlife. The tone of the wildlife may be accordingly matched to tones within a database, as described herein. As such, controller 204 may utilize data from sensors 218 to determine the type of wildlife. In certain embodiments, machine learning may be performed to more accurately determine such wildlife.

Based on the type of wildlife, the appropriate frequency may be selected, in 504. Based on the frequency and/or range of frequencies determined in 504, sound of the appropriate frequency and/or frequency range may be output in 506 from speaker 202. In various embodiments, controller 204 may also select the appropriate amplitude or range of amplitude of sound. In certain such embodiments, controller 204 may be configured to provide for an appropriate amplitude based on the detected environmental conditions (e.g., temperature or wind conditions), the type of wildlife, and/or the direction that wildlife is approaching from, and/or other factors in order to create an appropriate area around the windmill from which wildlife is deterred. As such, for example, the amplitude of the sound generated may be varied to be more effective in deterring certain types of wildlife. If the presence of those types of wildlife are identified, according to the techniques described herein, the sound amplitude may be accordingly varied (e.g., randomly or regularly). In certain embodiments, the amplitude of the sound may be specified by the data received in 502.

Figure 6:
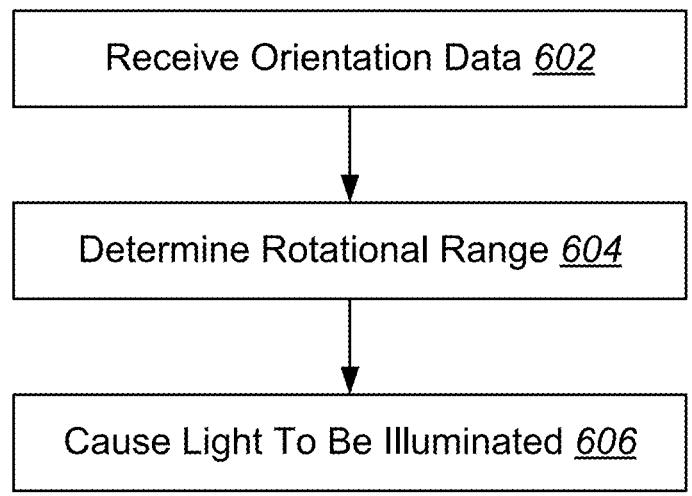
FIG. 6 illustrates a flow process for determining a rotational range of a warning light, in accordance with one or more embodiments.

FIG. 6 illustrates a flow process for determining a rotational range of a warning light, in accordance with one or more embodiments. FIG. 6 illustrates a technique for illuminating light 110 for providing warning to other aircraft or other embodiments as to the presence of the windmill. Typical windmills may have no warning lights or only include a warning light on top of the nacelle of the generator. The configuration described herein and the technique of FIG. 6 allows for light 110 to provide warning at a much higher height, increasing the safety of windmills. In various embodiments, light 110 may be present on one, some, or all propellers of a windmill.

In 602, orientation data is received from sensors 218 and/or one or more other sensors coupled to the propeller of the windmill. Orientation data may be data from an accelerometer, gyroscope, and/or other sensors that may detect the orientation of the propeller and/or where the propeller is in its rotation.

In 604, the rotational range for illumination of light 110 may be determined. The rotational range may be preprogrammed within controller 204 and/or provided through data received by controller 204 (e.g., via wireless communications through Bluetooth, WiFi, and/or other wireless communications protocol). For example, in certain embodiments, communications may be provided to controller 204 indicating the rotational range.

The rotational range may be, for example, the entire rotation, the top 60 degrees of rotation (e.g., the 30 degrees to either side of straight upward), the top 90 degrees of rotation, the top 180 degrees of rotation, and/or another range. Based on the rotational range, light 110 may be accordingly illuminated. Thus, for example, a determination may be made, from sensors 218, that light 110 is within the rotational ranges specified. Light 110 may then accordingly be illuminated in 606.

Any of the techniques described herein may be utilized in windmills and/or operation thereof. While various specific implementations have been particularly shown and described, it will be understood by those skilled in the art that changes in the form and details of the disclosed implementations may be made without departing from the spirit or scope of this disclosure. In addition, although various advantages, aspects, and objects have been discussed herein with reference to various implementations, it will be understood that the scope of this disclosure should not be limited by reference to such advantages, aspects, and objects.

What is claimed is:

1. A windmill comprising:
   a generator;
   a first windmill propeller blade, coupled to the generator and configured to rotate along a first direction of rotation; and
   a first flying wildlife emitter, coupled to the first windmill propeller blade, wherein the first flying wildlife emitter comprises:
      a speaker configured to generate soundwaves audible to at least one of birds or bats;
      an emitter generator, electrically coupled to the speaker and configured to generate electrical power to power the speaker;
      an emitter propeller, coupled to the emitter generator and configured to rotate along a second direction of rotation to rotate a portion of the emitter generator, wherein the second direction of rotation is substantially normal to the first direction of rotation;
      an emitter sensor, configured to detect an orientation of the first windmill propeller blade that the first flying wildlife emitter is coupled to and provide first orientation data; and
      an emitter controller, communicatively coupled to the emitter sensor and configured to:
         receive the first orientation data;
         determine, from the first orientation data, the orientation of the first windmill propeller blade that the first flying wildlife emitter is coupled to; and
         cause the speaker to change a volume or frequency of the generated soundwaves based on the orientation of the first windmill propeller blade that the first flying wildlife emitter is coupled to.

2. The windmill of claim 1, wherein the speaker is configured to generate soundwaves of between 9 to 200 kHz in frequency.

3. The windmill of claim 1, wherein the speaker is configured to generate soundwaves of between 1 to 4 kHz in frequency.

4. The windmill of claim 1, wherein the first flying wildlife emitter further comprises:
   a communications module,
   communicatiely coupled to the emitter controller, wherein the emitter controller is further configured to:
      receive communications data from the communications module;
      determine, from the communications data, a first frequency range; and
   cause the speaker to generate the soundwaves within the first frequency range.

5. The windmill of claim 1, further comprising:
   a servo, coupled to the emitter propeller and configured to change a pitch of the emitter propeller to, at least, a feathered configuration, wherein the feathered configuration comprises orienting blades of the emitter propeller to provide minimal air resistance to rotation of the first windmill propeller blade.

6. The windmill of claim 5, wherein the feathered configuration comprises orienting blades of the emitter propeller to an angle parallel to airflow produced by rotation of the first windmill propeller blade in the first direction of rotation.

7. The windmill of claim 1, wherein the first flying wildlife emitter further comprises:
   a battery, electrically coupled to the emitter generator and configured to store electrical power generated by the emitter generator.

8. The windmill of claim 1, further comprising:
   a first light, disposed on a tip of the first windmill propeller blade.

9. The windmill of claim 8, further comprising:
   an accelerometer and/or gyroscope, disposed within the first windmill propeller blade and configured to provide second orientation data of the first windmill propeller blade; and
   a windmill controller, communicatively coupled to the accelerometer and/or the gyroscope and configured to:
      receive the second orientation data;
      determine, from the second orientation data, that the first windmill propeller blade is within a rotational range; and
      cause the first light to illuminate based on the determination.

10. The windmill of claim 1, wherein the first flying wildlife emitter is removably coupled to the first windmill propeller blade.

11. The windmill of claim 1, further comprising:
    a second windmill propeller blade; and
    a second flying wildlife emitter, coupled to the second windmill propeller blade.

12. A flying wildlife emitter comprising:
    a speaker configured to generate soundwaves audible to at least one of birds or bats;
    an emitter generator, electrically coupled to the speaker and configured to generate electrical power to power the speaker;
    an emitter propeller, coupled to the emitter generator and configured to rotate a portion of the electrical generator;
    a coupler, configured to couple to a windmill propeller blade, wherein the windmill propeller blade is configured to rotate along a first direction of rotation, wherein the emitter propeller is configured to rotate along a second direction of rotation, and wherein the second direction of rotation is substantially normal to the first direction of rotation;

an emitter sensor, configured to detect an orientation of the windmill propeller blade that the flying wildlife emitter is coupled to and provide first orientation data; and an emitter controller, communicatively coupled to the emitter sensor and configured to:
receive the first orientation data;
determine, from the first orientation data, the orientation of the windmill propeller blade that the fiving wildlife emitter is coupled to; and
cause the speaker to change a volume or frequency of the generated soundwaves based on the orientation of the windmill propeller blade that the fiving wildlife emitter is coupled to.

13. The flying wildlife emitter of claim 12, wherein the speaker is configured to generate soundwaves of between 9 to 200 kHz in frequency.

14. The flying wildlife emitter of claim 12, wherein the speaker is configured to generate soundwaves of between 1 to 4 kHz in frequency.

15. The flying wildlife emitter of claim 12, further comprising:
a communications module, communicatiely coupled to the emitter controller, wherein the emitter controller is further configured to:
receive communications data from the communications module;
determine, from the communications data, a first frequency range; and
cause the speaker to generate the soundwaves within the first frequency range.

16. The flying wildlife emitter of claim 12, further comprising:
a battery, electrically coupled to the emitter generator and configured to store electrical power generated by the emitter generator.

17. The flying wildlife emitter of claim 12, further comprising:
a servo, coupled to the emitter propeller and configured to change a pitch of the emitter propeller to, at least, a feathered configuration, wherein the feathered configuration comprises orienting blades of the emitter propeller to provide minimal air resistance to rotation of the windmill propeller blade.

* * * * *